US008486368B2

(12) United States Patent
Takahashi et al.

(10) Patent No.: US 8,486,368 B2
(45) Date of Patent: Jul. 16, 2013

(54) HYDROCARBON-DECOMPOSING POROUS CATALYST BODY AND PROCESS FOR PRODUCING THE SAME, PROCESS FOR PRODUCING HYDROGEN-CONTAINING MIXED REFORMED GAS FROM HYDROCARBONS, AND FUEL CELL SYSTEM

(71) Applicant: Toda Kogyo Corporation, Otake (JP)

(72) Inventors: Shinji Takahashi, Hiroshima-ken (JP); Naoya Kobayashi, Hiroshima-ken (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

(21) Appl. No.: 13/633,316

(22) Filed: Oct. 2, 2012

(65) Prior Publication Data
US 2013/0045159 A1   Feb. 21, 2013

Related U.S. Application Data

(60) Division of application No. 12/874,505, filed on Sep. 2, 2010, now Pat. No. 8,304,367, which is a continuation-in-part of application No. PCT/JP2009/001001, filed on Mar. 5, 2009.

(30) Foreign Application Priority Data

Mar. 6, 2008 (JP) .................... 2008-57050

(51) Int. Cl.
*C01B 3/26* (2006.01)
*C01B 3/02* (2006.01)
*C01B 3/24* (2006.01)
*H01M 8/00* (2006.01)
*B01J 23/00* (2006.01)
*B01J 23/02* (2006.01)
*B01J 23/06* (2006.01)
*B01J 23/40* (2006.01)
*B01J 23/42* (2006.01)
*B01J 23/56* (2006.01)
*B01J 23/58* (2006.01)
*B01J 20/00* (2006.01)

(52) U.S. Cl.
USPC ........ 423/654; 423/648.1; 423/650; 423/651; 429/400; 502/327; 502/328; 502/332; 502/335; 502/337; 502/341; 502/355; 502/415; 502/439; 502/524

(58) Field of Classification Search
USPC .............. 502/327, 328, 332, 335, 337, 341, 502/355, 415, 439, 524; 423/648.1, 650, 423/651, 654; 429/400
See application file for complete search history.

(56) References Cited

U.S. PATENT DOCUMENTS

| 3,948,762 A | 4/1976 | Hayes |
| 4,051,071 A | 9/1977 | Hayes |
| 4,081,408 A | 3/1978 | Fischer et al. |
| 4,097,368 A | 6/1978 | Hayes |
| 4,104,200 A | 8/1978 | Cronauer et al. |
| 4,116,808 A | 9/1978 | Cronauer et al. |
| 4,167,495 A | 9/1979 | Hayes |
| 4,234,458 A | 11/1980 | Antos |
| 4,238,365 A | 12/1980 | Antos |
| 4,318,827 A | 3/1982 | Antos |
| 4,331,544 A | 5/1982 | Takaya et al. |
| 4,458,098 A | 7/1984 | Antos |
| 5,219,816 A | 6/1993 | Zhou et al. |
| 6,218,335 B1 | 4/2001 | Okada et al. |
| 2009/0261020 A1 | 10/2009 | Moon et al. |

FOREIGN PATENT DOCUMENTS

| JP | 2003-135967 | 5/2003 |
| WO | WO 2007/046591 A1 | 4/2007 |
| WO | WO 2009/027882 A2 | 5/2009 |

OTHER PUBLICATIONS

International Search Report for PCT/JP2009/001001, mailed Jun. 2, 2009.
Miyata et al, "Promoting Effect of Ru on Ni/Mg(Al)O Catalysts in DSS-like Operation of $CH_4$ Steam Reforming", Catalysis Communications, vol. 8, No. 3 (2007) 447-451.
Miyata et al, "Promoting Effect of Rh, Pd and Pt Noble Metals to the Ni/Mg(Al)O Catalysts for the DSS-like Operation in $CH_4$ Steam Reforming", Applied Catalysis A: General 310 (2006) 97-104.
Shishido et al, "Hydrotalcite o Zenkutai to sum Kobunsan Tanji Ni Shokubai no Chosei to sono Methane Kaishitsu Hanno eno Oyo", Shokubai, Mar. 10, 2002, vol. 44, No. 2, pp. 131-133 (with English translation).
Supplementary European Search Report dated Jul. 28, 2011 in EP 09 71 8038.
Carreno et al, "Synthesis of Metal-Oxide Matrix with Embedded Nickel Nanoparticles by a Bottom-Up Chemical Process", Journal of Nanoscience and Nanotechnology, vol. 3, No. 6, Jan. 1, 2003, pp. 516-520, XP002535568.
Shen et al, "Synthesis and Surface Acid/Base Properties of Magnesium-Aluminum Mixed Oxides Obtained from Hydrotalcites", Langmuir, 1994, 10, 3902-3908; XP-002650681.

(Continued)

*Primary Examiner* — Cam N. Nguyen
(74) *Attorney, Agent, or Firm* — Nixon & Vanderhye P.C.

(57) ABSTRACT

A process for producing the porous catalyst body for decomposing hydrocarbons, the body containing at least magnesium, aluminum and nickel, and has a pore volume of 0.01 to 0.5 cm$^3$/g, an average pore diameter of not more than 300 Å and an average crushing strength of not less than 3 kgf. The process includes molding hydrotalcite containing at least magnesium, aluminum and nickel, and calcining the resulting molded product at a temperature of 700 to 1500° C.

5 Claims, No Drawings

OTHER PUBLICATIONS

Di Cosimo et al, "Structure and Surface and Catalytic Properties of Mg-Al Basic Oxides", Journal of Catalysis, 178 499-510 (1998); XP-002651090.

HYDROCARBON-DECOMPOSING POROUS CATALYST BODY AND PROCESS FOR PRODUCING THE SAME, PROCESS FOR PRODUCING HYDROGEN-CONTAINING MIXED REFORMED GAS FROM HYDROCARBONS, AND FUEL CELL SYSTEM

This application is a divisional of application Ser. No. 12/874,505 filed Sep. 2, 2010, now allowed, which in turn is a Continuation-In-Part of International Application No. PCT/JP2009/001001 filed 5 Mar. 2009, which designated the U.S. and claims priority of Japan Application Nos. 2008-057050 filed 6 Mar. 2008, the entire contents of each of which are all hereby incorporated herein by reference.

TECHNICAL FIELD

The present invention aims at providing a catalyst as a porous catalyst body for decomposing hydrocarbons which comprises at least magnesium, aluminum and nickel, wherein the catalyst is less expensive, and has an excellent catalytic activity for decomposition and removal of hydrocarbons, an excellent anti-sulfur poisoning property, an excellent anti-coking property even under a low-steam condition, a sufficient strength capable of withstanding crushing and breakage even when coking occurs within the catalyst, and an excellent durability.

Also, the present invention relates to a porous catalyst body for decomposing hydrocarbons which comprises at least magnesium, aluminum and nickel, and a process for producing the porous catalyst body, as well as aims at providing a porous catalyst body for decomposing hydrocarbons which has a large number of micropores, a large specific surface area, a large pore volume and a high strength, and a process for producing the porous catalyst body.

In addition, the present invention aims at not only efficiently decomposing and removing hydrocarbons but also producing hydrogen by using the above catalyst.

BACKGROUND ART

In recent years, in the consideration of global environmental problems, early utilization techniques for new energies have been intensively studied, and fuel cells or batteries have been noticed as one of these techniques. In the fuel cells, hydrogen and oxygen are electrochemically reacted with each other to convert a chemical energy into an electric energy. Thus, the fuel cells are characterized by a high energy utilization efficiency and, therefore, have been positively studied for practical applications to civil life, industries or automobiles. The fuel cells generally known in the art are classified into a phosphoric acid type (PAFC), a molten carbonate type (MCFC), a solid oxide type (SOFC), a solid polymer type (PEFC), etc., according to kinds of electrolytes used therein.

As to the fuel sources for generating hydrogen used in the fuel cells, there have been made various studies on extensive hydrocarbon-containing raw materials including petroleum-based fuels such as kerosene, isooctane and gasoline, LPG or city gases.

As the method of obtaining a reformed gas comprising hydrogen as a main component by reforming the hydrocarbon-containing fuels, there are known various reforming techniques such as SR (steam reforming) method, PDX (partial oxidation) method and SR+PDX (autothermal) method. Among these reforming techniques, application of the steam-reforming (SR) method to cogeneration has been most noticed, since the SR method enables production of a reformed gas having a high hydrogen concentration.

The steam reforming (SR) is conducted according to the following reaction formula:

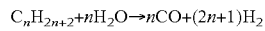

$$C_nH_{2n+2} + nH_2O \rightarrow nCO + (2n+1)H_2$$

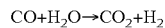

$$CO + H_2O \rightarrow CO_2 + H_2$$

In general, the above reaction is conducted at a temperature of 600 to 800° C. and a S/C ratio (steam/carbon ratio) of about 2.0 to about 3.5. In addition, the reaction is an endothermic reaction and, therefore, can be accelerated as the reaction temperature is increased.

In general, in the fuel cell system, there may be used the process in which after a substantially whole amount of sulfur components contained in a fuel is removed therefrom using a desulfurizer, the thus desulfurized hydrocarbon is then decomposed to obtain a reformed gas comprising hydrogen as a main component, and the resulting reformed gas is introduced into a fuel cell stack. In such a conventional process, a reforming catalyst is used to reform the hydrocarbons. However, the reforming catalyst tends to undergo deterioration in catalyst performance during the operation for a long period of time. In particular, the reforming catalyst tends to be poisoned with a trace amount of sulfur components slipped through the desulfurizer, resulting in problems such as significant deterioration in catalytic activity thereof. In addition, when $C_2$ or more hydrocarbons are used as a fuel, the hydrocarbons in the fuel tend to suffer from thermal decomposition, resulting in deposition of carbon on the catalyst, production of polycondensates and deterioration in performance of the reforming catalyst. Also, among these fuel cell systems, the reforming catalysts for PAFC and PEFC are generally used in the form of a molded product such as beads. In this case, if the beads-shaped catalysts suffer from significant coking inside thereof, the catalysts tend to be broken and powdered, resulting in clogging of a reaction tube therewith.

The fuels such as city gases, LPG, kerosene, gasoline and naphtha comprise not only $C_1$ but also $C_2$ or more hydrocarbons. For example, the city gas 13A comprises about 88.5% of methane, about 4.6% of ethane, about 5.4% of propane and about 1.5% of butane, i.e., comprises, in addition to methane as a main component thereof, hydrocarbons having 2 to 4 carbon atoms in an amount as large as 11.5%. Also, LPG comprises about 0.7% of ethane, about 97.3% of propane, about 0.2% of propylene and about 1.8% of butane, i.e., comprises the $C_4$ hydrocarbon in an amount of 1.8%. These $C_2$ or more hydrocarbons tend to be readily thermally decomposed to cause deposition of carbon.

At present, as an active metal species of the steam reforming catalysts, there may be used noble metals such as Pt, Rh, Ru, Ir and Pd, and base metals such as Ni, Co and Fe. Among these metals, in the consideration of high catalytic activity, there have been mainly used catalysts supporting a metal element such as Ni and Ru.

The noble metals such as Ru tend to hardly undergo deposition of carbon even under a low S/C (steam/carbon) ratio condition. However, the noble metals tend to be readily poisoned with sulfur components contained in the raw materials, and deteriorated in catalytic activity for a short period of time. Further, deposition of carbon tends to be extremely readily caused on the sulfur-poisoned catalysts. Thus, even in the case where the noble metals are used, there also tends to arise such a problem that deposition of carbon is induced by the poisoning with sulfur. In addition, since the noble metals are expensive, the fuel cell systems using the noble metals tend to become very expensive, thereby preventing further spread of such fuel cell systems.

On the other hand, since Ni as a base metal element tends to relatively readily undergo deposition of carbon, it is required that the Ni-containing catalyst is used under a high steam/carbon ratio condition in which steam is added in an excessive amount as compared to a theoretical compositional ratio thereof, so that the operation procedure tends to become complicated, and the unit requirement of steam tends to be increased, resulting in uneconomical process. Further, since the conditions for continuous operation of the system are narrowed, in order to complete the continuous operation of the system using the Ni-containing catalyst, not only an expensive control system but also a very complicated system as a whole are required. As a result, the production costs and maintenance costs tend to be increased, resulting in uneconomical process.

Since the steam reforming reaction is a high-temperature reaction and the fuel cell system is subjected to DSS (Daily Start-up and Shutdown) operation, the catalyst body filled in a reactor is gradually closely packed by repeated expansion/contraction and swelling of the reactor owing to external heating, which tends to finally cause breakage of the catalyst. For this reason, in the fuel cell system, α-alumina having a relatively high crushing strength has been generally used as a carrier for the catalyst.

However, the α-alumina has been generally produced by baking a raw material at a high temperature to enhance its crushing strength. Therefore, the resulting α-alumina exhibits an extremely small BET specific surface area and pore volume. As a result, an active metal species supported on the α-alumina tends to be readily sintered when exposed to heat, resulting in deterioration of its catalytic activity.

When using Ni which is relatively susceptible to deposition of carbon as the active metal species, an alkaline element such as CaO and MgO may be added to suppress the deposition of carbon on Ni. However, when the content of the alkaline element is too large, the resulting catalyst tends to be considerably deteriorated in strength.

In addition, in order to suppress the deposition of carbon, if an MgO carrier only is subjected to tablet molding or press molding to thereby forcibly increase a strength of the catalyst, the resulting catalyst tends to be deteriorated in catalytic activity. As a result, it may be very difficult to impart a high activity to the catalyst.

For the above-mentioned reasons, it has been demanded to provide a hydrocarbon-decomposing catalyst which is less expensive and can exhibit as its functions an excellent catalytic activity capable of decomposing and removing hydrocarbons, a good anti-coking property even under a low steam condition, a sufficient strength capable of withstanding crushing and breakage even when coking occurs within the catalyst, and an excellent durability.

Conventionally, there have been reported hydrocarbon-decomposing catalysts formed by supporting a catalytically active metal such as platinum, palladium, ruthenium, cobalt, rhodium, ruthenium and nickel on a carrier comprising α-alumina, magnesium oxide or titanium oxide (Patent Documents 1 to 4, etc.). Also, there are known the methods for producing a hydrocarbon-decomposing catalyst by using an Ni-containing hydrotalcite compound as a precursor (Patent Documents 5 to 7, etc.)

Patent Document 1: Japanese Patent Application Laid-Open (KOKAI) No. 9-173842
Patent Document 2: Japanese Patent Application Laid-Open (KOKAI) No. 2001-146406
Patent Document 3: Japanese Patent Application Laid-Open (KOKAI) No. 2004-82034
Patent Document 4: Japanese Patent Application Laid-Open (KOKAI) No. 2003-284949
Patent Document 5: Japanese Patent Application Laid-Open (KOKAI) No. 2000-503624
Patent Document 6: Japanese Patent Application Laid-Open (KOKAI) No. 2003-135967
Patent Document 7: Japanese Patent Application Laid-Open (KOKAI) No. 2004-255245

DISCLOSURE OF THE INVENTION

Problems to be Solved by the Invention

In the technique of the Patent Document 1, there is described the process for producing hydrogen by subjecting fuels comprising hydrocarbons such as kerosene to steam reforming using a catalyst comprising Ru as an active metal species which is supported on α-alumina as a carrier. However, it is considered that the Ru-based catalyst tends to suffer from sulfidization with sulfur components contained in the raw materials which results in promoted coking and deactivation of the catalyst.

In the techniques of the Patent Documents 2 and 3, the obtained catalysts are improved in anti-sulfur poisoning property, but still insufficient in their catalyst performance.

In the Patent Document 4, there is described the method of producing a high strength molded product from MgO solely. However, the resulting molded product has a very low breaking strength ranging from 0.3 to 1.2 kg/mm. Further, it is readily suggested that the BET specific surface area and pore volume of the catalyst are small, although not particularly described therein.

In the techniques of the Patent Documents 5 to 7, there are described hydrocarbon-decomposing catalysts obtained by using an Ni-containing hydrotalcite compound as a precursor. However, these Patent Documents fail to take a strength of the catalysts themselves into consideration.

In addition, as the carrier for generally used steam-reforming catalysts, there have been used γ-alumina, α-alumina, silica, zeolite, etc. However, among these conventional catalysts, there have been reported no porous catalyst bodies comprising a large amount of magnesium and having a large specific surface area and a high crushing strength.

Further, there has not been reported any method of producing a molded product from hydrotalcite as a precursor.

An object of the present invention is to provide a catalyst as a porous catalyst body for decomposing hydrocarbons which comprises at least magnesium, aluminum and nickel, wherein the catalyst is less expensive, and has an excellent catalytic activity for decomposition and removal of hydrocarbons, an excellent anti-sulfur poisoning property, an excellent anti-coking property even under a low-steam condition, a sufficient strength capable of withstanding crushing and breakage even when coking occurs within the catalyst, and an excellent durability.

Another object of the present invention is to provide a porous catalyst body for decomposing hydrocarbons which comprises at least magnesium, aluminum and nickel and a process for producing the porous catalyst body, in which the porous catalyst body includes a large number of micropores, and has a large specific surface area, a large pore volume and a high strength, as well as a process for producing the porous catalyst body.

A further object of the present invention is to provide a process for effectively decomposing and removing hydrocarbons and producing hydrogen by using the above catalyst.

Means for Solving the Problems

The above-described technical problems can be solved by the following aspects of the present invention.

That is, according to the present invention, there is provided a porous catalyst body for decomposing hydrocarbons which comprises at least magnesium, aluminum and nickel in such a manner that the magnesium and aluminum are present in the form of a composite oxide of magnesium and aluminum, and the nickel is present in the form of metallic nickel; and which porous catalyst body has a magnesium element content of 10 to 50% by weight, an aluminum element content of 5 to 35% by weight and a nickel element content of 0.1 to 30% by weight, a pore volume of 0.01 to 0.5 cm$^3$/g, an average pore diameter of not more than 300 Å and an average crushing strength of not less than 3 kgf. (Invention 1).

Also, according to the present invention, there is provided the porous catalyst body for decomposing hydrocarbons as described in the above Invention 1, wherein the metallic nickel is present in the form of fine particles having an average particle diameter of 1 to 20 nm (Invention 2).

Also, according to the present invention, there is provided the porous catalyst body for decomposing hydrocarbons as described in the above Invention 1 or 2, wherein the porous catalyst body has a BET specific surface area of 10 to 100 m$^2$/g (Invention 3).

Also, according to the present invention, there is provided a process for producing the porous catalyst body for decomposing hydrocarbons as described in any one of the above Inventions 1 to 3, which comprises the step of molding hydrotalcite comprising at least magnesium, aluminum and nickel; and calcining the resulting molded product at a temperature of 700 to 1500° C. (Invention 4).

Also, according to the present invention, there is provided the process as described in the above Invention 4, which further comprises the step of subjecting the calcined hydrotalcite molded product to reduction treatment at a temperature of 700 to 1000° C. (Invention 5).

Also, according to the present invention, there is provided the porous catalyst body for decomposing hydrocarbons as described in any one of the above Inventions 1 to 3, wherein one or more active metal species selected from the group consisting of gold, silver, platinum, palladium, ruthenium, cobalt, rhodium, iridium, rhenium, copper, manganese, chromium, vanadium and titanium which have an average particle diameter of not more than 50 nm, are supported on the porous catalyst body (Invention 6).

Also, according to the present invention, there is provided a process for producing a mixed reformed gas comprising hydrogen from hydrocarbons, which comprises the step of reacting the hydrocarbons with steam at a temperature of 250 to 850° C., at a molar ratio of steam to carbon (S/C) of 1.0 to 6.0 and at a space velocity (GHSV) of 100 to 100000 h$^{-1}$ by using the porous catalyst body for decomposing hydrocarbons as described in any one of the above Inventions 1, 2, 3 and 6 (Invention 7).

In addition, according to the present invention, there is provided a fuel cell system using the porous catalyst body for decomposing hydrocarbons as defined in any one of the above Inventions 1, 2, 3 and 6 (Invention 8).

Effect of the Invention

The porous catalyst body for decomposing hydrocarbons according to the present invention has a large BET specific surface area and a large pore volume and supports metallic nickel in the form of very fine particles. For this reason, the metallic nickel as an active metal species has an increased contact area with steam, and, therefore, can exhibit an excellent catalytic activity.

The porous catalyst body for decomposing hydrocarbons according to the present invention is produced by subjecting the raw materials to high-temperature calcination. For this reason, the porous catalyst body can maintain a large BET specific surface area and a large pore volume even when used under high-temperature condition, and can also maintain a high catalytic activity for a long period of time.

The porous catalyst body for decomposing hydrocarbons according to the present invention has a high crushing strength by formation of a spinel phase comprising magnesium and aluminum, and nickel and aluminum owing to the high-temperature calcination. For this reason, when the porous catalyst body suffers from coking during the steam reforming reaction, the catalyst molded product can maintain an excellent catalytic activity without suffering from breakage and powdering.

As described above, the porous catalyst body for decomposing hydrocarbons according to the present invention has a high catalytic activity. Therefore, even under a low-steam condition, the porous catalyst body can exhibit an excellent anti-coking property and a high catalytic activity.

In addition, the porous catalyst body for decomposing hydrocarbons according to the present invention can be enhanced in catalytic activity and anti-coking property as well as anti-oxidizing property by supporting an active metal species such as gold, silver, platinum, palladium, ruthenium, cobalt, rhodium, iridium, rhenium, copper, manganese, chromium, vanadium and titanium thereon.

Also, the porous catalyst body for decomposing hydrocarbons according to the present invention comprises a large amount of magnesium and therefore exhibits a very excellent anti-sulfur poisoning property as well as an excellent catalytic activity from the viewpoint of its durability.

PREFERRED EMBODIMENTS FOR CARRYING OUT THE INVENTION

The porous catalyst body for decomposing hydrocarbons according to the present invention is described below.

The porous catalyst body for decomposing hydrocarbons according to the present invention is formed of a compound comprising at least magnesium, aluminum and nickel in which the magnesium and aluminum are present in the form of a composite oxide of magnesium and aluminum, and the nickel is present in the form of metallic nickel. The porous catalyst body may also comprise, in addition to the magnesium, aluminum and nickel elements and oxygen as the composite oxide, other elements such as sodium, calcium, silicon, iron and zinc although not particularly limited thereto.

The content of magnesium in the porous catalyst body for decomposing hydrocarbons according to the present invention is 10 to 50% by weight. When the magnesium content is less than 10% by weight, the resulting porous catalyst body tends to have a small BET specific surface area and further tends to be deteriorated in anti-sulfur poisoning property. On the other hand, when the magnesium content is more than 50% by weight, the resulting porous catalyst body tends to be deteriorated in mechanical strength. The magnesium content in the porous catalyst body is preferably 15 to 45% by weight and more preferably 20 to 40% by weight.

Also, the content of aluminum in the porous catalyst body for decomposing hydrocarbons according to the present invention is 5 to 35% by weight. When the aluminum content is less than 5% by weight, the resulting porous catalyst body tends to be deteriorated in mechanical strength. On the other hand, when the aluminum content is more than 35% by weight, the resulting porous catalyst body tends to have a small BET specific surface area and, therefore, may fail to form a porous structure. The aluminum content in the porous catalyst body is preferably 10 to 30% by weight.

The content of nickel in the porous catalyst body for decomposing hydrocarbons according to the present invention is 0.1 to 30% by weight. When the nickel content is less than 0.1% by weight, the resulting porous catalyst body tends to be deteriorated in conversion rate of hydrocarbons. On the other hand, when the nickel content is more than 30% by weight, the particle size of the metallic nickel fine particles tends to exceed 20 nm, so that the resulting porous catalyst body tends to be considerably deteriorated in anti-coking property. The nickel content in the porous catalyst body is preferably 0.2 to 25% by weight.

The ratio between magnesium and aluminum in the porous catalyst body for decomposing hydrocarbons according to the present invention is not particularly limited, and it is preferred that the magnesium be present in a larger amount than that of the aluminum. The molar ratio of the magnesium to the aluminum (Mg:Al) is preferably 5:1 to 1:1. When the proportion of the magnesium is more than the above-specified range, it may be difficult to readily obtain a catalyst body having a sufficient strength. On the other hand, when the proportion of the magnesium is less than the above-specified range, the resulting catalyst body may fail to exhibit properties as a porous substance.

The porous catalyst body for decomposing hydrocarbons according to the present invention has a pore volume of 0.01 to 0.5 $cm^3/g$. When the pore volume is less than 0.01 $cm^3/g$, the resulting porous catalyst body may fail to support and disperse a sufficient amount of active metal species thereon. When the pore volume is more than 0.5 $cm^3/g$, the resulting porous catalyst body tends to be deteriorated in mechanical strength. The pore volume of the porous catalyst body is preferably 0.02 to 0.45 $cm^3/g$ and more preferably 0.05 to 0.40 $cm^3/g$.

The porous catalyst body for decomposing hydrocarbons according to the present invention has an average pore diameter of not more than 300 Å. When the average pore diameter is more than 300 Å, the resulting porous catalyst body may fail to support and disperse a sufficient amount of active metal species thereon. The average pore diameter of the porous catalyst body is preferably not more than 290 Å, and more preferably 50 to 280 Å.

In the porous catalyst body for decomposing hydrocarbons according to the present invention, metallic nickel is present in a composite oxide of magnesium and aluminum.

In the porous catalyst body for decomposing hydrocarbons according to the present invention, the metallic nickel has an average particle diameter of not more than 20 nm and exhibits an excellent catalytic activity which is optimum for production of hydrogen. When the average particle diameter of the metallic nickel is more than 20 nm, the resulting porous catalyst body tends to be deteriorated in catalytic activity required for the steam-reforming reaction in which hydrogen is produced by mixing a hydrocarbon gas with steam. The average particle diameter of the metallic nickel is preferably not more than 15 nm and more preferably not more than 10 nm. The lower limit of the average particle diameter of the metallic nickel is about 0.5 nm.

The porous catalyst body for decomposing hydrocarbons according to the present invention preferably has a BET specific surface area of 10 to 100 $m^2/g$. When the BET specific surface area is less than 10 $m^2/g$, the average pore diameter of the resulting porous catalyst body tends to be too large, so that the porous catalyst body may fail to support and disperse a sufficient amount of active metal species thereon. The porous catalyst body having a BET specific surface area of more than 100 $m^2/g$ may be difficult to industrially produce and, therefore, tends to be unpractical. The BET specific surface area of the porous catalyst body is more preferably 15 to 80 $m^2/g$ and still more preferably 20 to 60 $m^2/g$.

The porous catalyst body for decomposing hydrocarbons according to the present invention has an average crushing strength of not less than 3 kgf (29.4 N). When the average crushing strength is less than 3 kgf (29.4 N), the resulting porous catalyst body tends to be cracked or broken when used at a high temperature, and further tends to suffer from breakage or powdering when coking occurs with the catalyst. The average crushing strength of the porous catalyst body is preferably 4 to 50 kgf (39.2 to 490 N) and more preferably 5 to 40 kgf (49 to 392 N). Meanwhile, the average crushing strength may be measured by the method as described in Examples below.

In the porous catalyst body for decomposing hydrocarbons as defined in any one of the above Inventions 1 to 3, one or more active metal species selected from the group consisting of gold, silver, platinum, palladium, ruthenium, cobalt, rhodium, iridium, rhenium, copper, manganese, chromium, vanadium and titanium which have an average particle diameter of not more than 50 nm may be supported thereon (Invention 6). By supporting the above active metal species on the porous catalyst body, it is possible to further increase the amount of hydrocarbons decomposed.

The active metal species may be incorporated into the porous catalyst body for decomposing hydrocarbons according to the present invention simultaneously with production of the porous catalyst body or may be supported thereon after the production of the porous catalyst body, although not particularly limited thereto. The method of supporting the active metal species is also not particularly limited, and may include ordinary methods such as spray drying method and impregnation method.

When the average particle diameter of the active metal species such as gold, silver, platinum, palladium, ruthenium, cobalt, rhodium, iridium, rhenium, copper, manganese, chromium, vanadium and titanium is more than 50 nm, the effect of supporting the active metal species on the clay mineral tends to be hardly attained. The average particle diameter of the active metal species is preferably not more than 35 nm and more preferably not more than 20 nm.

The amount of the active metal species supported on the porous catalyst body for decomposing hydrocarbons is not particularly limited. For example, the amount of the active metal species supported on the porous catalyst body for decomposing hydrocarbons may be in the range of 0.01 to 30% by weight based on the weight of the porous catalyst body.

As the method of supporting nickel on the porous catalyst body for decomposing hydrocarbons according to the present invention, there may be used various methods. For example, there may be used the method of supporting nickel on a porous catalyst body for decomposing hydrocarbons which comprises magnesium and aluminum by an ordinary method such as a precipitation method, a heat impregnation method, a cold impregnation method, a vacuum impregnation method, an equilibrium adsorption method, an evaporation-to-dryness method, a competitive adsorption method, an ion exchange method, a spray method and a coating method; or the method in which nickel is incorporated into a spinel crystal structure compound comprising magnesium and aluminum to form a solid solution therewith, and then the solid solution is heat-treated to allow metallic nickel to deposit on the spinel carrier comprising magnesium and aluminum.

The porous catalyst body for decomposing hydrocarbons according to the present invention is preferably produced by the method in which the respective constitutional elements are subjected to co-precipitation reaction to form hydrotalcite particles as a precursor, and then the resulting hydrotalcite particles are baked with heating to form a porous catalyst body, followed by subjecting the obtained porous catalyst body to heat reduction.

There is also known the method in which the hydrotalcite particles are baked to obtain composite oxide particles, and then the composite oxide particles are hydrated with an aqueous solution comprising an anion to obtain layered composite hydroxide particles. In the present invention, nickel may also be supported by the following production method. The hydrotalcite particles on which nickel is supported may be subjected to heat reduction, if required after being baked with heating.

More specifically, the nickel may be supported by the method in which the porous catalyst body for decomposing hydrocarbons is impregnated with a solution comprising nickel to thereby regenerate a hydrotalcite phase comprising nickel in the vicinity of the surface of the porous oxide particles or a molded product thereof.

In addition, the nickel may also be supported by the method in which the porous catalyst body for decomposing hydrocarbons in which nickel has been allowed to be present on the surface of the respective particles according to the above production method, is further impregnated with a solution comprising nickel to thereby regenerate a hydrotalcite phase comprising nickel in the vicinity of the surface of the molded product.

Next, the process for producing the porous catalyst body for decomposing hydrocarbons according to the present invention is described.

In the process for producing the porous catalyst body for decomposing hydrocarbons according to the present invention, hydrotalcite compound particles comprising magnesium, aluminum and nickel as a precursor are molded to produce a molded product, and then the resulting molded product is heat-treated in a temperature range of 700 to 1500° C. to obtain the porous catalyst body.

The hydrotalcite compound particles comprising magnesium, aluminum and nickel as used in the present invention are obtained by mixing an anion-containing alkaline aqueous solution with an aqueous solution comprising a magnesium raw material, an aluminum raw material and a nickel raw material to prepare a mixed solution having a pH value of 7.0 to 13.0, aging the resulting mixed solution in a temperature range of 50 to 300° C., and then subjecting the resulting mixture to separation by filtration and drying.

The aging time is not particularly limited, and is 1 to 80 hr, preferably 3 to 24 hr and more preferably 5 to 18 hr. When the aging time is more than 80 hr, such a growth reaction tends to be industrially disadvantageous.

The magnesium raw material, the aluminum raw material and the nickel raw material are not particularly limited as long as they are in the form of a water-soluble material such as a nitric acid salt.

Examples of the magnesium raw material used in the above method include magnesium oxide, magnesium hydroxide, magnesium oxalate, magnesium sulfate, magnesium sulfite, magnesium nitrate, magnesium chloride, magnesium citrate, basic magnesium carbonate and magnesium benzoate.

Examples of the aluminum raw material used in the above method include aluminum oxide, aluminum hydroxide, aluminum acetate, aluminum chloride, aluminum nitrate, aluminum oxalate and basic aluminum ammonium sulfate.

Examples of the nickel raw material used in the above method include nickel oxide, nickel hydroxide, nickel sulfate, nickel carbonate, nickel nitrate, nickel chloride, nickel benzoate, basic nickel carbonate, nickel formate, nickel citrate and nickel diammonium sulfate.

The hydrotalcite compound particles comprising magnesium, aluminum and nickel as a precursor of the porous catalyst body for decomposing hydrocarbons according to the present invention preferably have an average plate surface diameter of 0.05 to 0.4 µm. When the average plate surface diameter of the hydrotalcite compound particles is less than 0.05 µm, it may be difficult to subject the resulting particles to separation by filtration and washing with water, so that it may be difficult to industrially produce the hydrotalcite compound particles. On the other hand, when the average plate surface diameter of the hydrotalcite compound particles is more than 0.4 µm, it may be difficult to produce the aimed porous catalyst body for decomposing hydrocarbons therefrom.

The hydrotalcite compound particles used in the present invention preferably have a crystallite size D006 of 0.001 to 0.08 µm. When the crystallite size D006 of the hydrotalcite compound particles is less than 0.001 µm, the viscosity of the resulting water suspension tends to be too high, so that it may be difficult to industrially produce the hydrotalcite compound particles. When the crystallite size D006 of the hydrotalcite compound particles is more than 0.08 µm, it may be difficult to produce the aimed porous catalyst body for decomposing hydrocarbons therefrom. The crystallite size D006 of the hydrotalcite compound particles is more preferably 0.002 to 0.07 µm.

The hydrotalcite compound particles comprising magnesium, aluminum and nickel as used in the present invention preferably have a BET specific surface area of 3.0 to 300 $m^2/g$. When the BET specific surface area of the hydrotalcite compound particles is less than 3.0 $m^2/g$, it may be difficult to produce the aimed porous catalyst body for decomposing hydrocarbons therefrom. When the BET specific surface area of the hydrotalcite compound particles is more than 300 $m^2/g$, the viscosity of the resulting water suspension tends to be too high, and it may also be difficult to subject the suspension to separation by filtration and washing with water. As a result, it may be difficult to industrially produce the hydrotalcite compound particles. The BET specific surface area of the hydrotalcite compound particles is more preferably 5.0 to 250 $m^2/g$.

The ratio between magnesium and aluminum in the hydrotalcite comprising magnesium, aluminum and nickel as used in the present invention is not particularly limited. The molar ratio of magnesium to aluminum (Mg:Al) in the hydrotalcite is preferably 4:1 to 1:1.

The particle diameter of secondary agglomerated particles of the hydrotalcite compound particles is 0.1 to 200 µm. When the particle diameter of the secondary agglomerated particles of the hydrotalcite compound particles is less than 0.1 µm, the resulting particles tend to be hardly subjected to pulverization treatment. As a result, it may be difficult to industrially produce the aimed particles. When the particle diameter of the secondary agglomerated particles of the hydrotalcite compound particles is more than 200 µm, it may be difficult to produce the aimed molded product therefrom.

The particle diameter of secondary agglomerated particles of the hydrotalcite compound particles is preferably 0.2 to 100 μm.

The pulverization treatment may be carried out using a general pulverizing device (such as an atomizer, YARIYA and a Henschel mixer).

In the molding step for producing the porous catalyst body for decomposing hydrocarbons according to the present invention, the hydrotalcite compound particles comprising at least magnesium, aluminum and nickel as a precursor of the porous catalyst body for decomposing hydrocarbons are mixed with a molding assistant and a binder and further with water and an alcohol as a dispersing medium, and the resulting mixture is kneaded using a kneader (such as a screw kneader) to form a clayey mass, followed by molding the resulting clayey mass. As the molding method, there may be used a compression molding method, a press molding method, a tablet molding method, etc.

The shape of the molded product of the porous catalyst body for decomposing hydrocarbons according to the present invention is not particularly limited and may be any shape suitably used for ordinary catalysts. Examples of the shape of the molded product include a spherical shape, a cylindrical shape, a hollow cylindrical shape and a pellet shape.

The porous catalyst body for decomposing hydrocarbons which has a spherical shape usually has a size of 1 to 10 mmφ and preferably 2 to 8 mmφ.

Examples of the molding assistant usable in the above method include celluloses, polyvinyl alcohol, starches, methyl cellulose, maltose and carboxymethyl cellulose. These molding assistants may be used in combination of any two or more thereof. The molding assistant is completely burned out by the calcination treatment and therefore dissipated from the porous catalyst body for decomposing hydrocarbons without any residues therein. The amount of the molding assistant added may be, for example, 1 to 50 parts by weight based on 100 parts by weight of the hydrotalcite compound particles comprising magnesium, aluminum and nickel.

Examples of the binder include those binders having no re-miscibility with water such as α-alumina, an aluminum salt, silica, clay, talc, bentonite, zeolite, cordierite, a titania alkali metal salt, an alkali earth metal salt, a rare earth metal salt, zirconia, mullite, sepiolite, montmorillonite, halloysite, saponite, stevensite, hectorite, and silica alumina. These binders may be used in combination of any two or more thereof. In the case where a salt other than an oxide is added as the binder, it is important that the salt is decomposed into an oxide by the calcination treatment. The amount of the binder added may be, for example, 1 to 50 parts by weight based on 100 parts by weight of the hydrotalcite compound particles comprising magnesium, aluminum and nickel.

Examples of the alcohols include monohydric alcohols such as ethanol and propanol; glycols such as ethylene glycol, propylene glycol, butanediol and polyethylene glycol; and polyhydric alcohols such as glycerol. These alcohols may be used in combination of any two or more thereof. The amount of the alcohols added may be, for example, 50 to 150 parts by weight based on 100 parts by weight of the hydrotalcite compound particles comprising magnesium, aluminum and nickel.

In addition, a combustible substance may be added to the hydrotalcite compound particles. Examples of the combustible substance include wood chips, cork particles, coal powder, activated carbon, crystalline cellulose powder, starches, sucrose, gluconic acid, polyethylene glycol, polyvinyl alcohol, polyacrylamide, polyethylene, polystyrene and a mixture thereof. As the amount of the above combustible substance added is increased, the pore volume of the resulting molded product becomes larger. However, the addition of an excessive amount of the combustible substance tends to result in deteriorated strength of the resulting molded product. Therefore, the amount of the combustible substance added may be suitably controlled in view of a good strength of the resulting molded product.

Alternatively, the porous catalyst body for decomposing hydrocarbons may be formed into a honeycomb structure. In such a case, the honeycomb-shaped molded product may be obtained by an optional method selected according to the requirements.

The clayey kneaded material molded by the above method may be dried by various methods such as air drying, hot air drying and vacuum drying.

The thus dried clayey kneaded material may be further heat-treated to obtain the porous catalyst body for decomposing hydrocarbons according to the present invention. The heat treatment may be carried out at a temperature of 700 to 1500° C. When the heat-treating temperature is lower than 700° C., the heat treatment tends to require a prolonged time to ensure a good crushing strength of the resulting porous catalyst body, resulting in industrial disadvantageous process. On the other hand, when the heat-treating temperature is higher than 1500° C., the resulting porous catalyst body for decomposing hydrocarbons tends to suffer from collapse of pores therein. The heat-treating temperature is preferably 800 to 1400° C. and more preferably 900 to 1300° C.

The heat-treating time is 1 to 72 hr. When the heat-treating time is shorter than 1 hr, the resulting porous catalyst body tends to be deteriorated in crushing strength. When the heat-treating time is longer than 72 hr, the resulting porous catalyst body for decomposing hydrocarbons tends to suffer from collapse of pores therein, and such a prolonged heat treatment tends to be disadvantageous from industrial viewpoints. The heat-treating time is preferably 2 to 60 hr and more preferably 3 to 50 hr.

The porous catalyst body for decomposing hydrocarbons according to the present invention is obtained by subjecting the calcined product of the porous catalyst body for decomposing hydrocarbons to reduction treatment at a temperature of 700 to 1000° C. When the temperature used in the reduction treatment is lower than 700° C., the nickel tends to be hardly metalized, so that the resulting porous catalyst body may fail to exhibit a high catalytic activity as aimed by the present invention. When the temperature used in the reduction treatment is higher than 1000° C., sintering of the nickel tends to excessively proceed so that the particle size of the metallic nickel fine particles tends to be too large. As a result, the resulting porous catalyst body tends to be deteriorated in conversion rate of lower hydrocarbons under a low-temperature condition, and further in anti-coking property. The temperature used in the reduction treatment is preferably 700 to 950° C.

The atmosphere used in the reduction treatment is not particularly limited as long as it is a reducing atmosphere such as a hydrogen-containing gas.

The time of the reduction treatment is not particularly limited and is desirably 0.5 to 24 hr. When the time of the reduction treatment is longer than 24 hr, the process tends to have no merit from industrial viewpoints. The time of the reduction treatment is preferably 1 to 10 hr.

Next, the process for producing a mixed reformed gas comprising hydrogen from hydrocarbons according to the present invention is described.

The porous catalyst body for decomposing hydrocarbons according to the present invention is contacted with hydrocarbons to obtain a mixed reformed gas comprising hydrogen.

In the process for producing a mixed reformed gas comprising hydrogen from hydrocarbons according to the present invention, a raw material gas comprising hydrocarbons and steam are contacted with the porous catalyst body for decomposing hydrocarbons according to the present invention under the conditions including a temperature of 250 to 850° C., a molar ratio of steam to carbons (S/C ratio) of 1.0 to 6.0 and a space velocity (GHSV) of 100 to 100000 $h^{-1}$.

When the reaction temperature is lower than 250° C., the conversion rate of lower hydrocarbons tends to be reduced, so that when the reaction is conducted for a long period of time, coking tends to be caused, finally resulting in deactivation of the catalyst. When the reaction temperature is higher than 850° C., the active metal species tends to suffer from sintering, so that the catalyst tends to be deactivated. The reaction temperature is preferably 300 to 700° C. and more preferably 400 to 700° C.

When the molar ratio S/C of steam (S) to carbons (C) is less than 1.0, the anti-coking property tends to be deteriorated. When the molar ratio S/C of steam (S) to carbons (C) is more than 6.0, a large amount of steam tends to be required for the production of hydrogen, resulting in high production costs and unpractical process. The molar ratio S/C is preferably 1.5 to 6.0 and more preferably 1.8 to 5.0.

Meanwhile, the space velocity (GHSV) is preferably 100 to 100000 $h^{-1}$ and more preferably 1000 to 10000 $h^{-1}$.

The hydrocarbons used in the present invention are not particularly limited, and various hydrocarbons may be used therein. Examples of the hydrocarbons may include saturated aliphatic hydrocarbons such as methane, ethane, propane, butane, pentane, hexane and cyclohexane; unsaturated hydrocarbons such as ethylene, propylene and butene; aromatic hydrocarbons such as benzene, toluene and xylene; and mixtures of these compounds. Also, suitable examples of the industrially usable raw materials may include city gas 13A, natural gases, LPG, kerosene, gasoline, light oils and naphtha.

When the hydrocarbons used in the present invention are those kept in a liquid state at room temperature such as kerosene, gasoline and light oils, such hydrocarbons may be vaporized by an evaporator upon use.

The porous catalyst body for decomposing hydrocarbons according to the present invention can exhibit sufficient catalytic activity, durability, anti-coking property and anti-sulfur poisoning property even in the case where the decomposition process is started by an autothermal reforming reaction and then changed to steam reforming reaction which is further continued for a long period of time. Therefore, the porous catalyst body of the present invention can provide an optimum catalyst for fuel cell systems into which DSS (Daily Start-up and Shutdown) is introduced.

<Function>

The reason why the porous catalyst body for decomposing hydrocarbons according to the present invention can exhibit a large specific surface area, a large pore volume and a high crushing strength and is excellent in catalytic activity, anti-sulfur poisoning property and anti-coking property, is considered by the present inventor as follows.

That is, the porous catalyst body for decomposing hydrocarbons according to the present invention is produced by subjecting a precursor obtained by molding hydrotalcite in the form of a laminar composite hydroxide to calcination treatment. Therefore, even when being subjected to the high-temperature calcination treatment, water included in the hydrotalcite is removed therefrom to produce an oxide of magnesium, aluminum and nickel which includes a large number of micropores. For this reason, the resulting porous catalyst body has very large specific surface area and pore volume. In addition, since water or carbonic ions being present between layers of the hydrotalcite are eliminated by the calcination treatment to form pores, the pore size of pores formed in the porous catalyst body can be reduced.

For the above reason, the porous catalyst body for decomposing hydrocarbons according to the present invention can maintain a large specific surface area even when calcined at a high temperature and, therefore, can exhibit a high crushing strength by the calcination.

The porous catalyst body for decomposing hydrocarbons according to the present invention can exhibit a higher crushing strength owing to formation of a spinel phase comprising magnesium and aluminum, and nickel and aluminum upon being subjected to the high-temperature calcination.

The porous catalyst body for decomposing hydrocarbons according to the present invention has an excellent catalytic activity because metallic nickel in the form of very fine particles is supported thereon so that the contact area of the metallic nickel as an active metal species with steam is enhanced.

In addition, as described above, the porous catalyst body for decomposing hydrocarbons according to the present invention has a high catalytic activity and, therefore, can exhibit an excellent anti-coking property and a high catalytic activity even under a low-steam condition.

Further, the porous catalyst body for decomposing hydrocarbons according to the present invention can be enhanced in catalytic activity and anti-coking property and further in anti-oxidizing property by supporting an active metal species such as gold, silver, platinum, palladium, ruthenium, cobalt, rhodium, iridium, rhenium, copper, manganese, chromium, vanadium and titanium thereon.

Furthermore, the porous catalyst body for decomposing hydrocarbons according to the present invention comprises a large amount of magnesium and, therefore, is extremely excellent in anti-sulfur poisoning property and also excellent in catalytic activity from the viewpoint of its durability.

EXAMPLES

Typical embodiments and examples of the present invention are as follows.

The BET specific surface area was measured by nitrogen BET method.

The average pore diameter and the pore volume were determined by BJH method using "TriStar 3000" manufactured by Shimadzu Seisakusho Corp.

The crushing strength of the catalyst molded product was determined from an average value of strengths of the 100 catalyst molded products which were measured using a digital force gauge manufactured by IMADA K.K. according to JIS Z 8841 (Granules and Agglomerates-Test Methods for Strength).

The particle size of each of metallic nickel, gold, silver, platinum, palladium, ruthenium, cobalt, rhodium, iridium, rhenium, copper, manganese, chromium, vanadium and titanium was expressed by an average value of the particle sizes measured by an electron microscope. The particle size of the metal fine particles which was more than 10 nm was calculated according to the Scherrer's formula from particle sizes thereof measured using an X-ray diffractometer "RINT 2500" manufactured by Rigaku Denki Co., Ltd., (tube: Cu;

tube voltage: 40 kV; tube current: 300 mA; goniometer: wide-angle goniometer; sampling width: 0.020°; scanning speed: 2°/min; light-emitting slit: 1°; scattering slit: 1°; light-receiving slit: 0.50 mm). The particle size of each of metallic nickel, gold, silver, platinum, palladium, ruthenium, cobalt, rhodium, iridium, rhenium, copper, manganese, chromium, vanadium and titanium which was determined using the X-ray diffractometer was the same as that measured using the electron microscope.

The content of each of magnesium, aluminum, nickel, gold, silver, platinum, palladium, ruthenium, cobalt, rhodium, iridium, rhenium, copper, manganese, chromium, vanadium and titanium was determined as follows. That is, a sample was dissolved in an acid, and the resulting solution was analyzed by a plasma emission spectroscopic device ("SPS-4000" manufactured by Seiko Denshi Kogyo Co., Ltd.).

Typical examples of the present invention are described below.

Example 1

Production of Hydrotalcite Compound Particles $MgSO_4 \cdot 7H_2O$, $Al_2(SO_4)_3 \cdot 8H_2O$ and $NiSO_4 \cdot 6H_2O$ were weighed in amounts of 1927.7 g, 1001.2 g and 541.2 g, respectively, and dissolved in pure water to prepare 12000 ml of a mixed solution thereof. Separately, 8044 mL of an NaOH solution (concentration: 14 mol/L) were mixed with a solution in which 305.5 g of $Na_2CO_3$ were dissolved, to prepare 23000 mL of an alkali mixed solution. Then, the thus prepared alkali mixed solution was mixed with the mixed solution comprising the above magnesium salt, aluminum salt and nickel salt, and the resulting solution was aged at 95° C. for 8 hr to obtain a hydrotalcite compound. The resulting hydrotalcite compound was separated by filtration, dried, and then pulverized to obtain hydrotalcite compound particles. As a result, it was confirmed that the thus obtained hydrotalcite compound particles had a BET specific surface area of 43.2 m²/g, and the secondary agglomerated particles thereof obtained after being subjecting to the pulverization treatment had an average particle diameter of 13.7 μm.

<Production of Porous Catalyst Body for Decomposing Hydrocarbons>

Next, 1058.7 g of the thus obtained hydrotalcite compound particles were mixed with 127.1 g of boehmite, 121.2 g of PVA, 105.8 g of water and 741.1 g of propylene glycol, and the resulting mixture was kneaded using a screw kneader for 5 hr. The thus obtained clayey kneaded material was formed into a 5.1 mmφ spherical shape by a compression molding method, and the resulting spherical molded product was dried at 105° C. and then heat-treated at 1100° C. for 3 hr. Thereafter, the resulting molded product was subjected to reduction treatment at 780° C. in a gas flow comprising hydrogen and argon at a volume ratio of 10/90 for 3 hr, thereby obtaining a porous catalyst body for decomposing hydrocarbons.

As a result, it was confirmed that the resulting spherical (diameter: 4.5 mmφ) porous catalyst body for decomposing hydrocarbons had a BET specific surface area of 58.5 m²/g, an average pore diameter of 166 Å and a pore volume of 0.185 cm³/g. In addition, as a result of analysis of the resulting porous catalyst body, it was confirmed that the Mg content therein was 25.07% by weight, the Al content therein was 22.48% by weight, the Ni content therein was 15.93% by weight, the size of metallic nickel fine particles therein was 7.8 nm, and the average crushing strength thereof was 32.6 kgf.

<Reaction Using the Porous Catalyst Body for Decomposing Hydrocarbons>

The performance of the obtained porous catalyst body for decomposing hydrocarbons was evaluated as follows. That is, 10 to 50 g of the porous catalyst body was filled in a stainless steel reaction tube having a diameter of 20 mm to prepare a catalyst-filled tube.

A raw material gas and steam were flowed through the catalyst-filled tube (reactor) under the conditions including a reaction pressure of 0.1 MPa, a reaction temperature of 300 to 800° C. and a space velocity of 10000 $h^{-1}$. At this time, the ratio of steam to carbon was 1.0, and the ratio of steam to carbon was 3.0. Meanwhile, the reaction was conducted using a city gas (13A) as the raw material gas comprising hydrocarbons.

Since $C_2$ or more hydrocarbons were decomposed into methane, $CO$, $CO_2$ and $H_2$, the catalyst performance was evaluated using a $C_n$ conversion rate (conversion rate of whole hydrocarbons). Also, when using the city gas (13A) as the raw material gas, a conversion rate of the $C_2$ or more hydrocarbons (such as ethane, propane, butane and pentane) in the raw material gas was calculated and regarded as a conversion rate of the city gas (13A).

Example

In the case where propane was used as the raw material gas:

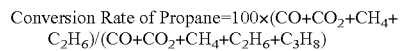

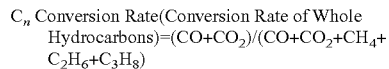

The catalyst performances of the porous catalyst bodies for decomposing hydrocarbons including hydrocarbons are shown in Tables 1 and 2.

In Table 1, there is shown the relationship between the reaction temperature (300 to 700° C.) and the conversion rate when the reaction was conducted using a city gas (13A) as the raw material gas under the conditions including a space velocity (GHSV) of 3000 $h^{-1}$ and 50000 $h^{-1}$, a ratio of steam to carbon (S/C) of 3.0 and a reaction time of 24 hr.

In Table 2, there is shown the relationship between the reaction time, the conversion rate of propane and the amounts of carbon deposited before and after measurement of the catalytic activity, when the reaction was conducted using a city gas (13A) as the raw material gas under the conditions including a space velocity (GHSV) of 3000 $h^{-1}$, a reaction temperature of 700° C. and a ratio of steam to carbon (S/C) of 1.5, as well as the relationship between the reaction time, crushing strength, BET specific surface area and pore volume when the ratio of steam to carbon (S/C) was 1.5.

Example 2

$MgCl_2 \cdot 6H_2O$, $AlCl_3 \cdot 9H_2O$ and $NiCl_2 \cdot 6H_2O$ were weighed in amounts of 5619.8 g, 741.5 g and 142.9 g, respectively, and dissolved in pure water to prepare 12000 ml of a mixed solution thereof. Separately, 9924 mL of an NaOH solution (concentration: 14 mol/L) were mixed with a solution in which 455.8 g of $Na_2CO_3$ were dissolved, to prepare 28000 mL of an alkali mixed solution. Then, the thus prepared alkali mixed solution was mixed with the mixed solution comprising the above magnesium salt, aluminum salt and nickel salt, and the resulting solution was aged at 180° C. for 8 hr to obtain a hydrotalcite compound. The resulting hydrotalcite compound was separated by filtration, dried, and then pulverized to obtain hydrotalcite compound particles. As a result, it was confirmed that the thus obtained hydrotalcite compound particles had a BET specific surface area of 12.2 m$^2$/g, and the secondary agglomerated particles thereof obtained after being subjected to the pulverization treatment had an average particle diameter of 32.2 μm.

Next, 2601 g of the thus obtained hydrotalcite compound particles were mixed with 78.05 g of talc, 546.3 g of starch, 1170.6 g of water and 780.5 g of ethylene glycol, and the resulting mixture was kneaded using a screw kneader for 1.5 hr. The thus obtained clayey kneaded material was formed into a 5.2 mmφ spherical shape by a press molding method, and the resulting spherical molded product was dried at 120° C. and then heat-treated at 1250° C. for 10 hr. Thereafter, the resulting molded product was subjected to reduction treatment at 850° C. in a gas flow comprising hydrogen and argon at a volume ratio of 90/10 for 1.5 hr, thereby obtaining a porous catalyst body for decomposing hydrocarbons.

As a result, it was confirmed that the resulting spherical (diameter: 2.6 mmφ) porous catalyst body for decomposing hydrocarbons had a BET specific surface area of 11.9 m$^2$/g, an average pore diameter of 208 Å and a pore volume of 0.112 cm$^3$/g. In addition, as a result of analysis of the resulting porous catalyst body, it was confirmed that the Mg content therein was 44.65% by weight, the Al content therein was 10.78% by weight, the Ni content therein was 2.344% by weight, the size of metallic nickel fine particles therein was 2.2 nm, and the average crushing strength thereof was 48.2 kgf.

Example 3

Mg(NO$_3$)$_2$.6H$_2$O, Al(NO$_3$)$_3$.9H$_2$O and Ni(NO$_3$)$_2$.6H$_2$O were weighed in amounts of 864.3 g, 549.8 g and 639.2 g, respectively, and dissolved in pure water to prepare 10000 ml of a mixed solution thereof. Separately, 2638 mL of an NaOH solution (concentration: 14 mol/L) were mixed with a solution in which 217.5 g of Na$_2$CO$_3$ were dissolved, to prepare 24000 mL of an alkali mixed solution. Then, the thus prepared alkali mixed solution was mixed with the mixed solution comprising the above magnesium salt, aluminum salt and nickel salt, and the resulting solution was aged at 70° C. for 6 hr to obtain a hydrous composite hydroxide. The resulting hydrous composite hydroxide was separated by filtration, dried, and then pulverized to obtain hydrotalcite compound particles. As a result, it was confirmed that the thus obtained hydrotalcite compound particles had a BET specific surface area of 119.2 m$^2$/g, and the secondary agglomerated particles thereof obtained after being subjected to the pulverization treatment had an average particle diameter of 52.1 μm.

Next, 642.8 g of the thus obtained hydrotalcite compound particles were mixed with 35.35 g of γ-alumina, 60.75 g of methyl cellulose, 128.6 g of water and 385.7 g of ethylene glycol, and the resulting mixture was kneaded using a screw kneader for 2 hr. The thus obtained clayey kneaded material was formed into a 2.1 mmφ cylindrical shape by an extrusion molding method, and the resulting cylindrical molded product was dried at 120° C. and then heat-treated at 750° C. for 18 hr. Thereafter, the resulting molded product was subjected to reduction treatment at 730° C. in a gas flow comprising hydrogen and argon at a volume ratio of 50/50 for 4.5 hr, thereby obtaining a porous catalyst body for decomposing hydrocarbons.

As a result, it was confirmed that the resulting cylindrical (diameter: 1.8 mmφ) porous catalyst body for decomposing hydrocarbons had a BET specific surface area of 98.5 m$^2$/g, an average pore diameter of 82.4 Å and a pore volume of 0.462 cm$^3$/g. In addition, as a result of analysis of the resulting porous catalyst body, it was confirmed that the Mg content therein was 18.21% by weight, the Al content therein was 21.74% by weight, the Ni content therein was 28.69% by weight, the size of metallic nickel fine particles therein was 3.5 nm, and the average crushing strength thereof was 3.3 kgf.

Example 4

MgSO$_4$.7H$_2$O, Al$_2$(SO$_4$)$_3$.8H$_2$O and NiSO$_4$.6H$_2$O were weighed in amounts of 3223.3 g, 1272.1 g and 1100.3 g, respectively, and dissolved in pure water to prepare 15000 ml of a mixed solution thereof. Separately, 4552 mL of an NaOH solution (concentration: 14 mol/L) were mixed with a solution in which 388.3 g of Na$_2$CO$_3$ were dissolved, to prepare 23000 mL of an alkali mixed solution. Then, the thus prepared alkali mixed solution was mixed with the mixed solution comprising the above magnesium salt, aluminum salt and nickel salt, and the resulting solution was aged at 80° C. for 6 hr to obtain a hydrotalcite compound. The resulting hydrotalcite compound was separated by filtration, dried, and then pulverized to obtain hydrotalcite compound particles. As a result, it was confirmed that the thus obtained hydrotalcite compound particles had a BET specific surface area of 72.4 m$^2$/g, and the secondary agglomerated particles thereof obtained after being subjected to the pulverization treatment had an average particle diameter of 2.2 μm.

Next, 1701 g of the thus obtained hydrotalcite compound particles were mixed with 144.6 g of kaolinite, 160.8 g of PVA, 85.08 g of water and 1395.3 g of propylene glycol, and the resulting mixture was kneaded using a screw kneader for 8 hr. The thus obtained clayey kneaded material was formed into a 4.9 mmφ spherical shape by a compression molding method, and the resulting spherical molded product was dried at 105° C. and then heat-treated at 1050° C. for 12 hr. Thereafter, the resulting molded product was subjected to reduction treatment at 880° C. in a gas flow comprising hydrogen and argon at a volume ratio of 95/5 for 8 hr, thereby obtaining a porous catalyst body for decomposing hydrocarbons.

As a result, it was confirmed that the resulting spherical (diameter: 3.8 mmφ) porous catalyst body for decomposing hydrocarbons had a BET specific surface area of 27.5 m$^2$/g, an average pore diameter of 122 Å and a pore volume of 0.142 cm$^3$/g. In addition, as a result of analysis of the resulting porous catalyst body, it was confirmed that the Mg content therein was 27.30% by weight, the Al content therein was 14.72% by weight, the Ni content therein was 21.11% by weight, the size of metallic nickel fine particles therein was 18.5 nm, and the average crushing strength thereof was 17.4 kgf.

Example 5

MgCl$_2$.6H$_2$O, AlCl$_3$.9H$_2$O, NiCl$_2$.6H$_2$O and CoCl$_2$.6H$_2$O were weighed in amounts of 1597.3 g, 431.1 g, 664.8 g and 169.9 g, respectively, and dissolved in pure water to prepare 8000 ml of a mixed solution thereof. Separately, 4755 mL of an NaOH solution (concentration: 14 mol/L) were mixed with a solution in which 265.0 g of Na$_2$CO$_3$ were dissolved, to prepare 22000 mL of an alkali mixed solution. Then, the thus prepared alkali mixed solution was mixed with the mixed solution comprising the above magnesium salt, aluminum salt, nickel salt and cobalt salt, and the resulting solution was aged at 140° C. for 10 hr to obtain a hydrotalcite compound. The resulting hydrotalcite compound was separated by filtration, dried, and then pulverized to obtain hydrotalcite compound particles. As a result, it was confirmed that the thus obtained hydrotalcite compound particles had a BET specific surface area of 13.2 m$^2$/g, and the secondary agglomerated particles thereof obtained after being subjected to the pulverization treatment had an average particle diameter of 22.2 µm.

Next, 1134 g of the thus obtained hydrotalcite compound particles were mixed with 34.03 g of talc, 158.8 g of PVA, 260.9 g of water and 680.6 g of ethylene glycol, and the resulting mixture was kneaded using a screw kneader for 3.3 hr. The thus obtained clayey kneaded material was formed into a 10 mmφ spherical shape by a press molding method, and the resulting spherical molded product was dried at 120° C. and then heat-treated at 1150° C. for 10 hr. Thereafter, the resulting molded product was subjected to reduction treatment at 810° C. in a gas flow comprising hydrogen and argon at a volume ratio of 90/10 for 3.5 hr, thereby obtaining a porous catalyst body for decomposing hydrocarbons.

As a result, it was confirmed that the resulting spherical (diameter: 6.5 mmφ) porous catalyst body for decomposing hydrocarbons had a BET specific surface area of 17.5 $m^2/g$, an average pore diameter of 251 Å and a pore volume of 0.121 $cm^3/g$. In addition, as a result of analysis of the resulting porous catalyst body, it was confirmed that the Mg content therein was 26.65% by weight, the Al content therein was 13.01% by weight, the Ni content therein was 22.63% by weight, the Co content therein was 5.681% by weight, the size of metallic nickel fine particles therein was 9.8 nm, the size of metallic cobalt fine particles therein was 12.2 nm, and the average crushing strength thereof was 34.2 kgf.

Example 6

The clayey kneaded material was formed into a 5.2 mmφ spherical shape in the same manner as defined in Example 1. The resulting spherical molded product was dried at 120° C. and then heat-treated at 1000° C. for 8 hr. Thereafter, Ru was sprayed and supported on the resulting molded product such that the amount of Ru supported was 2.2% by weight in terms of metallic Ru. After being dried, the resulting product was subjected to reduction treatment at 760° C. in a gas flow comprising hydrogen and argon at a volume ratio of 10/90 for 2 hr.

As a result, it was confirmed that the resulting spherical (diameter: 4.7 mmφ) porous catalyst body for decomposing hydrocarbons had a BET specific surface area of 41.5 $m^2/g$, an average pore diameter of 138 Å and a pore volume of 0.161 $cm^3/g$. In addition, as a result of analysis of the resulting porous catalyst body, it was confirmed that the Mg content therein was 24.52% by weight, the Al content therein was 21.98% by weight, the Ni content therein was 15.58% by weight, the Ru content therein was 2.182% by weight, the size of metallic nickel fine particles therein was 5.5 nm, the size of metallic ruthenium fine particles therein was 6 nm, and the average crushing strength thereof was 15.4 kgf.

Example 7

$Mg(NO_3)_2 \cdot 6H_2O$ and $Al(NO_3)_3 \cdot 9H_2O$ were weighed in amounts of 1523.1 g and 618.9 g, respectively, and dissolved in pure water to prepare 10000 ml of a mixed solution thereof. Separately, 2400 mL of an NaOH solution (concentration: 14 mol/L) were mixed with a solution in which 244.9 g of $Na_2CO_3$ were dissolved, to prepare 15000 mL of an alkali mixed solution. Then, the thus prepared alkali mixed solution was mixed with the mixed solution comprising the above magnesium salt and aluminum salt, and the resulting solution was aged at 85° C. for 4 hr to obtain a hydrous composite hydroxide. The resulting hydrous composite hydroxide was separated by filtration, dried, and then pulverized to obtain hydrotalcite compound particles. As a result, it was confirmed that the thus obtained hydrotalcite compound particles had a BET specific surface area of 86.5 $m^2/g$, and the secondary agglomerated particles thereof obtained after being subjected to the pulverization treatment had an average particle diameter of 42.1 µm.

Next, 487.6 g of the thus obtained hydrotalcite compound particles were mixed with 41.17 g of γ-alumina, 49.41 g of methyl cellulose, 179.7 g of water and 396.8 g of ethylene glycol, and the resulting mixture was kneaded using a screw kneader for 1.5 hr. The thus obtained clayey kneaded material was formed into a 2.5 mmφ cylindrical shape by an extrusion molding method, and the resulting cylindrical molded product was dried at 95° C. and then heat-treated at 950° C. for 20 hr.

Thereafter, a nickel salt was sprayed and supported on the resulting molded product such that the amount of Ni supported was 8.0% by weight in terms of metallic Ni. After being dried, the resulting product was subjected to reduction treatment at 760° C. in a gas flow comprising hydrogen and argon at a volume ratio of 50/50 for 5 hr, thereby obtaining a porous catalyst body for decomposing hydrocarbons.

As a result, it was confirmed that the resulting cylindrical (diameter: 2.1 mmφ) porous catalyst body for decomposing hydrocarbons had a BET specific surface area of 78.5 $m^2/g$, an average pore diameter of 102.4 Å and a pore volume of 0.371 $cm^3/g$. In addition, as a result of analysis of the resulting porous catalyst body, it was confirmed that the Mg content therein was 29.61% by weight, the Al content therein was 22.73% by weight, the Ni content therein was 7.944% by weight, the size of metallic nickel fine particles therein was 4.2 nm, and the average crushing strength thereof was 8.2 kgf.

Comparative Example 1

A mixture obtained by mixing 895.6 g of MgO, 9.652 g of γ-alumina, 71.52 g of PVA and 521.3 g of water with each other was kneaded together using a screw kneader for 1 hr. The thus obtained clayey kneaded material was formed into a 5.1 mmφ spherical shape by a compression molding method, and the resulting spherical molded product was dried at 120° C. and then heat-treated at 1250° C. for 8 hr. Thereafter, Ni was sprayed and supported on the resulting molded product such that the amount of Ni supported was 34% by weight in terms of metallic Ni. After being dried, the resulting product was subjected to reduction treatment at 800° C. in a gas flow comprising hydrogen and argon at a volume ratio of 10/90 for 3 hr. As a result, it was confirmed that the resulting spherical (diameter: 3.2 mmφ) catalyst body had a BET specific surface area of 2.2 $m^2/g$, an average pore diameter of 382 Å and a pore volume of 0.009 $cm^3/g$. In addition, as a result of analysis of the resulting catalyst body, it was confirmed that the Mg content therein was 39.77% by weight, the Al content therein was 0.563% by weight, the Ni content therein was 33.33% by weight, the size of metallic nickel fine particles therein was 35.5 nm, and the average crushing strength thereof was 4.3 kgf.

Comparative Example 2

A mixture obtained by mixing 845.3 g of γ-alumina and 22.54 g of PVA was granulated while spraying pure water thereover using a rolling granulator, thereby obtaining a spherical γ-alumina molded product having a diameter of 4.8 mmφ. The thus obtained spherical molded product was dried at 120° C. and then heat-treated at 850° C. for 10 hr. Thereafter, Ni was sprayed and supported on the resulting molded product such that the amount of Ni supported was 20% by weight in terms of metallic Ni. After being dried, the resulting product was subjected to reduction treatment at 780° C. in a gas flow comprising hydrogen and argon at a volume ratio of 10/90 for 2 hr. As a result, it was confirmed that the resulting spherical (diameter: 2.7 mmφ) catalyst body had a BET specific surface area of 185.5 m²/g, an average pore diameter of 322 Å and a pore volume of 0.532 cm³/g. In addition, it was confirmed that the Al content in the catalyst body was 42.96% by weight, the Ni content therein was 18.79% by weight, the size of metallic nickel fine particles therein was 25.5 nm, and the average crushing strength thereof was 1.2 kgf.

Comparative Example 3

A mixture obtained by mixing 847.2 g of the hydrotalcite compound particles obtained in Example 1 and 440.4 g of water with each other was kneaded together using a screw kneader for 5 hr. The thus obtained clayey kneaded material was formed into a 5.3 mmφ spherical shape by a compression molding method, and the resulting spherical molded product was dried at 105° C. and then heat-treated at 1100° C. for 3 hr. Thereafter, the resulting product was subjected to reduction treatment at 780° C. in a gas flow comprising hydrogen and argon at a volume ratio of 10/90 for 3 hr, thereby obtaining a porous catalyst body for decomposing hydrocarbons. As a result, it was confirmed that the resulting spherical (diameter: 4.5 mmφ) porous catalyst body for decomposing hydrocarbons had a BET specific surface area of 65.2 m²/g, an average pore diameter of 144 Å and a pore volume of 0.198 cm³/g. In addition, as a result of analysis of the resulting catalyst body, it was confirmed that the Mg content therein was 29.42% by weight, the Al content therein was 17.19% by weight, the Ni content therein was 18.71% by weight, the size of metallic nickel fine particles therein was 6.5 nm, and the average crushing strength thereof was 1.1 kgf.

TABLE 1

| | Reaction temperature (° C.) | GHSV = 3000 h⁻¹ 13A conversion rate (%) | GHSV = 50000 h⁻¹ 13A conversion rate (%) |
|---|---|---|---|
| Examples | | | |
| Example 1 | 300 | 10.04 | 9.93 |
| | 400 | 22.68 | 22.6 |
| | 500 | 45.98 | 45.87 |
| | 600 | 78.24 | 78.12 |
| | 700 | 97.3 | 97.22 |
| Example 2 | 300 | 10.04 | 9.92 |
| | 400 | 22.69 | 22.54 |
| | 500 | 45.97 | 45.84 |
| | 600 | 87.2 | 78.06 |
| | 700 | 97.29 | 97.17 |
| Example 3 | 300 | 10.02 | 9.94 |
| | 400 | 22.67 | 22.57 |
| | 500 | 45.94 | 45.81 |
| | 600 | 78.21 | 78.06 |
| | 700 | 97.28 | 97.08 |
| Example 4 | 300 | 10.03 | 9.96 |
| | 400 | 22.68 | 22.61 |
| | 500 | 45.95 | 45.85 |
| | 600 | 78.21 | 78.04 |
| | 700 | 97.27 | 97.11 |
| Example 5 | 300 | 10.05 | 10.02 |
| | 400 | 22.7 | 22.65 |
| | 500 | 45.98 | 45.93 |
| | 600 | 78.24 | 78.21 |
| | 700 | 97.3 | 97.29 |
| Examples and Comparative Examples | | | |

TABLE 1-continued

| | Reaction temperature (° C.) | GHSV = 3000 h⁻¹ 13A conversion rate (%) | GHSV = 50000 h⁻¹ 13A conversion rate (%) |
|---|---|---|---|
| Example 6 | 300 | 10.05 | 10.04 |
| | 400 | 22.7 | 22.71 |
| | 500 | 45.97 | 45.94 |
| | 600 | 78.21 | 78.17 |
| | 700 | 97.3 | 97.28 |
| Example 7 | 300 | 10.02 | 10.02 |
| | 400 | 22.65 | 22.68 |
| | 500 | 45.95 | 45.92 |
| | 600 | 78.19 | 78.11 |
| | 700 | 97.28 | 97.26 |
| Comparative Example 1 | 300 | 6.23 | 4.85 |
| | 400 | 14.19 | 11.65 |
| | 500 | 30.11 | 24.62 |
| | 600 | 63.29 | 55.93 |
| | 700 | 82.15 | 74.26 |
| Comparative Example 2 | 300 | 6.05 | 4.12 |
| | 400 | 12.71 | 9.28 |
| | 500 | 28.04 | 23.16 |
| | 600 | 60.74 | 51.12 |
| | 700 | 79.05 | 70.94 |
| Comparative Example 3 | 300 | 10.01 | 9.89 |
| | 400 | 22.65 | 22.58 |
| | 500 | 45.95 | 45.86 |
| | 600 | 78.19 | 78.08 |
| | 700 | 97.18 | 97.21 |

TABLE 2

| Examples | Reaction time (h) | S/C = 1.5 13A conversion rate (%) | Amount of carbon deposited (wt %) |
|---|---|---|---|
| Example 1 | 12 | 86.46 | 0.03 |
| | 200 | 86.64 | 0.05 |
| | 300 | 86.43 | 0.11 |
| Example 2 | 12 | 86.45 | 0.07 |
| | 100 | 86.44 | 0.09 |
| | 200 | 86.43 | 0.13 |
| Example 3 | 12 | 86.45 | 0.05 |
| | 100 | 86.44 | 0.07 |
| | 200 | 86.42 | 0.14 |
| Example 4 | 12 | 86.43 | 0.08 |
| | 100 | 86.44 | 0.09 |
| | 200 | 86.44 | 0.13 |
| Example 5 | 12 | 86.46 | 0.02 |
| | 100 | 86.45 | 0.03 |
| | 200 | 86.46 | 0.03 |

| Examples | Reaction time (h) | BET specific surface area (m²/g) | Pore volume (cm³/g) | Crushing strength (kgf) |
|---|---|---|---|---|
| Example 1 | 12 | 58.5 | 0.185 | 32.6 |
| | 200 | 58.5 | 0.186 | 32.5 |
| | 300 | 58.4 | 0.185 | 32.7 |
| Example 2 | 12 | 11.9 | 0.112 | 48.2 |
| | 100 | 11.8 | 0.112 | 48.1 |
| | 200 | 11.6 | 0.111 | 48.7 |
| Example 3 | 12 | 98.5 | 0.462 | 3.3 |
| | 100 | 98.3 | 0.461 | 3.3 |
| | 200 | 97.9 | 0.442 | 3.3 |
| Example 4 | 12 | 27.5 | 0.142 | 17.4 |
| | 100 | 27.5 | 0.141 | 17.6 |
| | 200 | 27.5 | 0.142 | 17.2 |
| Example 5 | 12 | 17.5 | 0.121 | 34.2 |
| | 100 | 17.5 | 0.121 | 34.4 |
| | 200 | 17.5 | 0.119 | 34.1 |

| Examples and | | S/C = 1.5 13A | Amount of carbon |

TABLE 2-continued

| Comparative Examples | Reaction time (h) | conversion rate (%) | deposited (wt %) |
|---|---|---|---|
| Example 6 | 12 | 86.46 | 0.01 |
|  | 100 | 86.46 | 0.02 |
|  | 200 | 86.46 | 0.02 |
| Example 7 | 12 | 86.43 | 0.06 |
|  | 100 | 86.46 | 0.08 |
|  | 200 | 86.45 | 0.16 |
| Comparative Example 1 | 12 | 55.21 | 2.56 |
|  | 100 | 35.69 | 4.58 |
|  | 200 | 14.52 | 9.85 |
| Comparative Example 2 | 12 | 43.26 | 5.74 |
|  | 100 | 24.13 | 8.19 |
|  | 200 | 10.52 | 12.25 |
| Comparative Example 3 | 12 | 86.42 | 0.04 |
|  | 100 | 86.43 | 0.06 |
|  | 200 | 86.41 | 0.12 |

| Examples | Reaction time (h) | BET specific surface area (m$^2$/g) | Pore volume (cm$^3$/g) | Crushing strength (kgf) |
|---|---|---|---|---|
| Example 6 | 12 | 41.5 | 0.161 | 15.4 |
|  | 100 | 41.5 | 0.158 | 15.6 |
|  | 200 | 41.6 | 0.159 | 15.7 |
| Example 7 | 12 | 78.5 | 0.371 | 8.2 |
|  | 100 | 78.4 | 0.368 | 8.3 |
|  | 200 | 78.3 | 0.364 | 8.5 |
| Comparative Example 1 | 12 | 2.2 | 0.009 | 4.3 |
|  | 100 | 2.1 | 0.008 | 3.5 |
|  | 200 | 1.8 | 0.008 | 3.2 |
| Comparative Example 2 | 12 | 185.5 | 0.532 | 1.2 |
|  | 100 | 102.3 | 0.362 | 0.9 |
|  | 200 | 65.4 | 0.214 | 0.7 |
| Comparative Example 3 | 12 | 65.2 | 0.198 | 1.1 |
|  | 100 | 64.3 | 0.195 | 0.9 |
|  | 200 | 63.8 | 0.193 | 0.7 |

INDUSTRIAL APPLICABILITY

The porous catalyst body for decomposing hydrocarbons according to the present invention has a large BET specific surface area and a large pore volume, and metallic nickel is supported thereon in the form of very fine particles. Therefore, in the porous catalyst body of the present invention, a contact area of the metallic nickel as an active metal species with steam is increased, resulting in excellent catalytic activity of the resulting catalyst.

The porous catalyst body for decomposing hydrocarbons according to the present invention is produced by high-temperature calcination. Therefore, the porous catalyst body can maintain a large BET specific surface area and a large pore volume as well as can exhibit an excellent catalytic activity for a long period of time even when exposed to high-temperature conditions.

The porous catalyst body for decomposing hydrocarbons according to the present invention is formed with a spinel phase comprising magnesium and aluminum, and nickel and aluminum owing to the high-temperature calcination, and therefore exhibits a high crushing strength. Thus, the porous catalyst body can maintain an excellent catalytic activity without breakage and powdering thereof even when coking occurs during the steam reforming reaction.

In addition, as described above, the porous catalyst body for decomposing hydrocarbons according to the present invention has a high catalytic activity, and therefore can exhibit an excellent anti-coking property and a high catalytic activity even under a low-steam condition.

The invention claimed is:

1. A process for producing a porous catalyst body for decomposing hydrocarbons which comprises at least magnesium, aluminum and nickel in such a manner that the magnesium and aluminum are present in the form of a composite oxide of magnesium and aluminum, and the nickel is present in the form of metallic nickel; and which porous catalyst body has a magnesium element content of 10 to 50% by weight, an aluminum element content of 5 to 35% by weight and a nickel element content of 0.1 to 30% by weight, a pore volume of 0.01 to 0.5 cm$^3$/g, an average pore diameter of not more than 300 Å and an average crushing strength of not less than 3 kgf,
the process comprising the steps of:
molding hydrotalcite comprising at least magnesium, aluminum and nickel; and
calcining the resulting molded product at a temperature of 700 to 1500° C.

2. A process according to claim 1, further comprising the step of subjecting the calcined hydrotalcite molded product to reduction treatment at a temperature of 700 to 1000° C.

3. A process for producing a mixed reformed gas comprising hydrogen from hydrocarbons, comprising the step of reacting the hydrocarbons with steam at a temperature of 250 to 850° C., at a molar ratio of steam to carbon (S/C) of 1.0 to 6.0 and at a space velocity (GHSV) of 100 to 100000 h$^{-1}$ in the presence of the porous catalyst body for decomposing hydrocarbons which comprises at least magnesium, aluminum and nickel in such a manner that the magnesium and aluminum are present in the form of a composite oxide of magnesium and aluminum, and the nickel is present in the form of metallic nickel; and which porous catalyst body has a magnesium element content of 10 to 50% by weight, an aluminum element content of 5 to 35% by weight and a nickel element content of 0.1 to 30% by weight, a pore volume of 0.01 to 0.5 cm$^3$/g, an average pore diameter of not more than 300 Å and an average crushing strength of not less than 3 kgf.

4. A process for producing a mixed reformed gas comprising hydrogen from hydrocarbons, comprising the step of reacting the hydrocarbons with steam at a temperature of 250 to 850° C., at a molar ratio of steam to carbon (S/C) of 1.0 to 6.0 and at a space velocity (GHSV) of 100 to 100000 h$^{-1}$ in the presence of the porous catalyst body for decomposing hydrocarbons which comprises at least magnesium, aluminum and nickel in such a manner that the magnesium and aluminum are present in the form of a composite oxide of magnesium and aluminum, and the nickel is present in the form of metallic nickel; and which porous catalyst body has a magnesium element content of 10 to 50% by weight, an aluminum element content of 5 to 35% by weight and a nickel element content of 0.1 to 30% by weight, a pore volume of 0.01 to 0.5 cm$^3$/g, an average pore diameter of not more than 300 Å and an average crushing strength of not less than 3 kgf and supported on the catalyst body are one or more active metal species selected from the group consisting of gold, silver, platinum, palladium, ruthenium, cobalt, rhodium, iridium, rhenium, copper, manganese, chromium, vanadium and titanium which have an average particle diameter of not more than 50 nm.

5. A fuel cell system comprising a porous catalyst body for decomposing hydrocarbons which comprises at least magnesium, aluminum and nickel in such a manner that the magnesium and aluminum are present in the form of a composite oxide of magnesium and aluminum, and the nickel is present in the form of metallic nickel; and which porous catalyst body has a magnesium element content of 10 to 50% by weight, an aluminum element content of 5 to 35% by weight and a nickel element content of 0.1 to 30% by weight, a pore volume of 0.01 to 0.5 cm$^3$/g, an average pore diameter of not more than 300 Å and an average crushing strength of not less than 3 kgf.

* * * * *